United States Patent
Klenk et al.

(10) Patent No.: US 8,650,942 B2
(45) Date of Patent: Feb. 18, 2014

(54) METHOD FOR DIAGNOSING AN EXHAUST GAS SENSOR AND DEVICE FOR CARRYING OUT THE METHOD

(75) Inventors: Mathias Klenk, Tuebingen (DE); Bernhard Kamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 241 days.

(21) Appl. No.: 13/188,974

(22) Filed: Jul. 22, 2011

(65) Prior Publication Data
US 2012/0023908 A1 Feb. 2, 2012

(30) Foreign Application Priority Data

Aug. 2, 2010 (DE) .......................... 10 2010 038 761
Jan. 11, 2011 (DE) .......................... 10 2011 002 502

(51) Int. Cl.
*G01M 15/10* (2006.01)

(52) U.S. Cl.
USPC ..................................................... 73/114.69

(58) Field of Classification Search
USPC ............... 73/114.69, 114.71, 114.72, 114.73, 73/114.77
See application file for complete search history.

(56) References Cited

U.S. PATENT DOCUMENTS

| | | | | |
|---|---|---|---|---|
| 6,304,813 | B1 * | 10/2001 | Ikeda et al. | 701/109 |
| 2003/0178016 | A1 * | 9/2003 | Nebiyeloul-Kifle et al. | 123/676 |
| 2005/0143897 | A1 | 6/2005 | Ripper et al. | |
| 2005/0252497 | A1 * | 11/2005 | Yasui et al. | 123/697 |

FOREIGN PATENT DOCUMENTS

| | | |
|---|---|---|
| DE | 10133384 | 1/2003 |
| DE | 10358195 | 7/2005 |

* cited by examiner

*Primary Examiner* — Eric S McCall
(74) *Attorney, Agent, or Firm* — Kenyon & Kenyon LLP

(57) ABSTRACT

A method is described for diagnosing an exhaust gas sensor which is situated in the exhaust gas area of an internal combustion engine for the purpose of detecting at least one exhaust gas component, which is heated with the aid of a sensor heater and whose temperature is detected. A device for carrying out the method is also described. The exhaust gas sensor is heated to a diagnosis starting temperature which is higher than the exhaust gas temperature; the heat output of the sensor heater is reduced or the sensor heater is completely turned off at least to the extent that the sensor temperature is able to decrease; the decreasing sensor temperature is detected; a measure for the temperature drop in relation to time is ascertained; this measure is compared with a first temperature gradient threshold value; and an error signal is provided if the temperature drop is too slow and therefore the ascertained measure for the temperature drop in relation to time does not exceed the first temperature gradient threshold value.

15 Claims, 2 Drawing Sheets

METHOD FOR DIAGNOSING AN EXHAUST GAS SENSOR AND DEVICE FOR CARRYING OUT THE METHOD

CROSS REFERENCE

The present application claims the benefit under 35 U.S.C. §119 of German Patent Application No. DE 102010038761.4 filed on Aug. 2, 2010, which is expressly incorporated herein by reference in its entirety, and German Patent Application No. DE 102011002502.2 filed on Jan. 11, 2011, which is expressly incorporated herein by reference in its entirety.

FIELD OF THE INVENTION

The present invention is directed to a method for diagnosing an exhaust gas sensor and a device for carrying out the method. A computer program and a computer program product are also the subject matter of the present invention.

BACKGROUND INFORMATION

To comply with the legal limits on emissions from internal combustion engines, different exhaust gas cleaning components as well as sensor units for regulating the internal combustion engine and monitoring emissions are used. For example, oxidation catalytic converters, diesel particle filters (DPF), SCR catalytic converters and $NO_x$ catalytic converters are known as exhaust gas cleaning components. Corresponding sensor systems include lambda sensors, $NO_x$ sensors and particle sensors.

Due to legal requirements which are being planned or have already gone into force, for example, the particle emissions of a motor vehicle which has an internal combustion engine designed, in particular, as a diesel engine, must be monitored upstream and/or downstream from a particulate filter during vehicle operation. According to the legislation, the monitoring of these components and sensor units for malfunctions and improper removal must furthermore be ensured. Such monitoring may be reliably ensured with the aid of a so-called on-board diagnosis (OBD).

For example, a method for monitoring a component situated in an exhaust gas area of an internal combustion engine is described in German Patent Application No. DE 103 58 195 A1, in which a measure for a first exhaust gas temperature is ascertained upstream from the component, and in which a second exhaust gas temperature, which occurs downstream from the component, is measured by a second temperature sensor. It is provided that the lowpass behavior, which is determined by the thermal capacity of the component, is checked by evaluating the first exhaust gas temperature in relation to the second exhaust gas temperature, and an error signal is output if a predefined measure for the lowpass behavior of the component changes.

This method may be used to assess the status of the component which is located between the two temperature sensors in the direction of the exhaust gas flow. For example, impermissible manipulations of this component as well as the complete removal of the component may thus be detected.

A collecting particle sensor is described in German Patent Application No. DE 101 33 384 A1 as an example of an exhaust gas sensor. The particle sensor is constructed from two meshing, comb-like electrodes which are at least partially covered by a collecting sleeve. When particles from the exhaust gas of the internal combustion engine accumulate on the particle sensor, this results in an analyzable change in the impedance of the particle sensor, from which the quantity of accumulated particles, and thus the quantity of particles carried in the exhaust gas, may be inferred. The particles accumulated on the particle sensor must be periodically burned off to make the sensor ready for measuring again. For this purpose, the particle sensor is heated to a predefined burn-off temperature, at which the particles oxidize, with the aid of a sensor heater.

SUMMARY

An object of the present invention is to provide a method for diagnosing an exhaust gas sensor and a device for carrying out the method which permit the detection of a particle coating on the exhaust gas sensor or on an exhaust gas sensor protective tube as well as the detection of a clogged, or manipulated protective tube.

A method according to an example embodiment of the present invention for diagnosing an exhaust gas sensor is based on the fact that the exhaust gas sensor is situated in the exhaust gas area of an internal combustion engine for the purpose of detecting at least one exhaust gas component which is heated with the aid of a sensor heater and whose temperature is detected. The example method according to the present invention is characterized by the fact that the exhaust gas sensor is heated to a diagnosis starting temperature which is higher than the exhaust gas temperature; the heat output of the sensor heater is reduced, or the sensor heater is turned off completely, at least to the extent that the exhaust gas sensor is able to cool; the temperature drop in the exhaust gas sensor is detected; a measure for the temperature drop in relation to time—i.e., the temperature gradient or a temperature difference quotient—is ascertained; this measure is compared with a first temperature gradient threshold value; and an error signal is provided if the temperature drop is too slow and the temperature gradient therefore does not exceed the temperature gradient threshold value.

The method according to the example embodiment of the present invention enables an exhaust gas sensor to be diagnosed in a way that permits compliance with predefined emission values relating to the exhaust gas component monitored by the exhaust gas sensor. If the exhaust gas sensor already has a sensor heater, the existing sensor heater may be used to carry out the diagnosis.

The diagnosis permits the detection of an increase in the thermal inertia of the exhaust gas sensor, which indicates a particle coating on the sensor or on a protective tube surrounding the exhaust gas sensor. In particular, a clogged exhaust gas sensor protective tube may be detected.

The method according to an embodiment of the present invention is suitable, in particular, for exhaust gas sensors which already have a sensor heater. However, the exhaust gas sensor may also be heated indirectly, for example with the aid of the exhaust gas. The concept of a sensor heater should also apply in this case.

The example method is suitable, in particular, for diagnosing a collecting particle sensor, which must be periodically burned free of the accumulated particles, so that the sensor must in any case be periodically heated to an elevated temperature of, for example, 900° C. The exhaust gas sensor preferably includes a temperature sensor which provides a measure for the temperature. However, the inner resistance of a heating element or a sensor element, for example, may also be detected and evaluated for the purpose of detecting the sensor temperature, thus making it unnecessary to provide a specific, separate temperature sensor.

One example embodiment provides that a certain time difference is predefined and the temperature difference is ascertained as a measure for the temperature drop in relation to time. Alternatively, a certain temperature difference may be predefined and the time difference ascertained as a measure for the temperature drop in relation to time.

It may be particularly advantageous to predefine a waiting time before ascertaining the temperature gradient of the sensor temperature over time, after the sensor temperature drop begins. The waiting time may be used to influence the reliability of the diagnosis.

A refinement of the example method according to the present invention provides that the measure for the temperature drop in relation to time is compared with a second temperature gradient threshold value, and the error signal is likewise provided if the temperature drop is too fast and the temperature gradient therefore exceeds the second temperature gradient threshold value. The second temperature gradient threshold value is therefore higher in terms of its absolute amount than the first temperature gradient threshold value. This refinement may be used, for example, to detect when a protective tube surrounding the exhaust gas sensor is opened or removed, which causes excessively rapid cooling.

The first and, if provided, the second temperature gradient threshold value may be dependent on the exhaust gas temperature, the first and, if applicable, the second temperature gradient threshold value being reduced at a higher exhaust gas temperature. As an alternative or in addition, the first and, if provided, the second temperature gradient threshold value may be dependent on the exhaust gas volumetric flow and/or the exhaust gas mass flow, the first and, if applicable, the second temperature gradient threshold value being increased at a higher exhaust gas volumetric flow or exhaust gas mass flow.

The temperature which may be reached with the aid of the sensor heater should be much higher than the expected exhaust gas temperature so that great selectivity is achieved during diagnosis. The reachable diagnosis starting temperature may be, for example, in the range between 750° C. and 950° C., preferably 900° C.

To ensure a reliable diagnosis result, it may furthermore be provided that the exhaust gas temperature is compared with an exhaust gas temperature threshold value, and if the exhaust gas temperature threshold value is exceeded, the diagnosis is not started or a diagnosis in progress is aborted, or an already existing diagnosis result is discarded. The exhaust gas temperature threshold value may be, for example, 500° C.

An example device according to the present invention for carrying out the method initially relates to a specially configured control unit which includes an arrangement for carrying out the method. The control unit may be a sensor control unit which is separate from an internal combustion engine control unit.

The control unit preferably includes a heater regulator, a temperature gradient ascertainment means and a temperature gradient comparator.

The control unit preferably includes at least one electrical memory in which the method steps are stored in the form of a control unit program.

An example computer program according to the present invention provides that all steps in the method according to the present invention are carried out when it runs on a computer.

An example computer program product according to the present invention, which includes a program code stored on a machine-readable carrier, carries out the method according to the present invention when the program runs on a computer.

Exemplary embodiments of the present invention are illustrated in the figures and explained in greater detail below.

DETAILED DESCRIPTION OF EXAMPLE EMBODIMENTS

Figure 1:
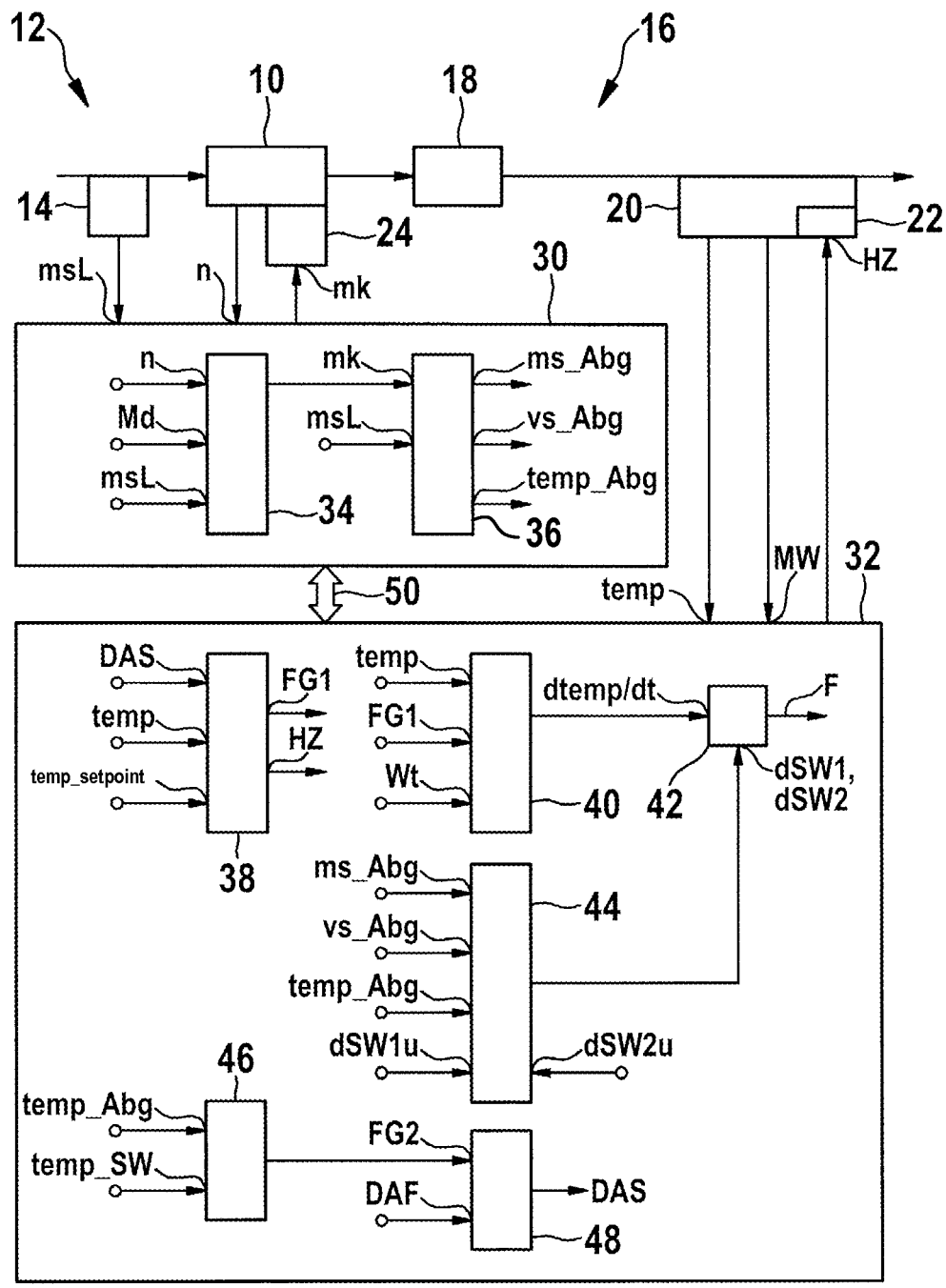
FIG. 1 shows a technical environment in which an example method according to the present invention is carried out.

FIG. 1 shows an internal combustion engine 10 in whose intake area 12 an air sensor 14 is situated and in whose exhaust gas area 16 an exhaust gas purification system 18 and an exhaust gas sensor 20 are situated. A sensor heater 22 is assigned to exhaust gas sensor 20 and a fuel metering system 24 is assigned to internal combustion engine 10.

Air sensor 14 supplies an air signal msL to an internal combustion engine control unit 30, and internal combustion engine 10 provides a rotational speed signal n. Internal combustion engine control unit 30 supplies a fuel signal mK to fuel metering system 24.

Exhaust gas sensor 20 supplies a sensor temperature temp and a measured value MW to a sensor control unit 32. Sensor control unit 32 supplies a heating signal HZ to exhaust gas sensor 20.

Internal combustion engine control unit 30 includes a fuel signal setting 34, to which rotational speed signal n, a torque signal Md and air signal msL are supplied and which supplies fuel signal mK, which is supplied to both fuel metering system 24 and an exhaust gas parameter ascertaining element 36, to which air signal msL is also supplied. Exhaust gas parameter ascertaining element 36 provides an exhaust gas mass flow ms_Abg, an exhaust gas volumetric flow vs_Abg and an exhaust gas temperature temp_Abg.

Exhaust gas sensor control unit 32 includes heater regulator 38, to which a diagnosis request signal DAS, sensor temperature temp and a sensor temperature setpoint value which corresponds to a diagnosis starting temperature temp_setpoint are supplied and which supplies a first enabling signal FG1 as well as heating signal HZ.

Sensor control unit 32 furthermore includes a temperature gradient ascertaining element 40, to which sensor temperature temp, first enabling signal FG1 and a waiting time Wt are supplied and which supplies a temperature gradient dtemp/dt over time which is supplied to a temperature gradient evaluation 42, to which a first and a second temperature gradient threshold value dSW1, dSW2 are also supplied and which supplies an error signal F.

Temperature gradient threshold value dSW is supplied by a temperature gradient threshold value setting 44, to which exhaust gas mass flow ms_Abg, exhaust gas volumetric flow vs_Abg, exhaust gas temperature temp_Abg, an uncorrected first temperature gradient threshold value dSW1$u$ and an uncorrected second temperature gradient threshold value dSW2$u$ are supplied.

In addition, sensor control unit 32 includes an exhaust gas temperature comparator 46 to which exhaust gas temperature temp_Abg and an exhaust gas temperature threshold value temp_SW are supplied and which supplies a second enabling signal FG2 which is supplied to a diagnosis signal setting 48, to which a diagnosis query signal DAF is also supplied and which supplies diagnosis request signal DAS.

A signal bus 50 is provided between internal combustion engine control unit 30 and sensor control unit 32.

The method according to the present invention is explained in greater detail below on the basis of the temperature-time diagram illustrated in FIG. 2.

Fuel signal setting 34 ascertains fuel signal mK, which is supplied to fuel metering system 24, as a function of, for example, rotational speed signal n of internal combustion engine 10, a torque requested by internal combustion engine 10, which is represented by torque signal Md, and, if necessary, air signal msL, which reflects a measure for the air mass supplied to internal combustion engine 10.

Exhaust gas parameter ascertaining element 36 ascertains exhaust gas mass flow ms_Abg, exhaust gas volumetric flow vs_Abg and exhaust gas temperature temp_Abg at least from air signal msL and fuel signal mK. The three ascertained exhaust gas parameters ms_Abg, vs_Abg, temp_Abg may be transmitted to sensor control unit 32, via signal bus 50, for example a CAN bus, provided that a sensor control unit 32 of this type is provided separately from internal combustion engine control unit 30.

Exhaust gas sensor 20 provides at least one measured value MW as the sensor signal which reflects a measure for at least one exhaust gas component. Exhaust gas sensor 20 is, for example, a particle sensor which monitors the proper operation of exhaust gas purification system 18, which includes, for example, a particle filter. Exhaust gas sensor 20, for example the aforementioned particle sensor, may have a protective tube which extends into exhaust gas area 16.

Exhaust gas sensor 20 has sensor heater 22, which heats exhaust gas sensor 20 when a heating signal HZ is present. Sensor heater 22 must be able to heat exhaust gas sensor 20 to a sensor temperature temp, which is higher than expected exhaust gas temperature temp_Abg. If a diesel internal combustion engine 10 is used, an exhaust gas temperature temp_Abg which does not exceed 500° C. may be assumed. If a particle sensor is assumed as exhaust gas sensor 20, a temperature which lies within the range of 750° C. to 950° C., and is preferably 900° C., may be predefined as the setpoint value for diagnosis starting temperature temp_setpoint. At this temperature, a collecting particle sensor may be simultaneously burned free of the accumulated soot particles.

Due to legal requirements, a diagnosis of exhaust gas sensor 20 may be required, sooting of exhaust gas sensor 20 to be detected, or, in general, an accumulation of particles on exhaust gas sensor 20 or sooting resulting in clogging of an exhaust gas sensor protective tube, in particular, being assumed here.

According to the present invention, a sensor temperature drop over time after reaching diagnosis starting temperature temp_setpoint is evaluated, this sensor temperature drop occurring after the heat output of sensor heater 22 is reduced or after sensor heater 22 has been completely shut down.

Figure 2:
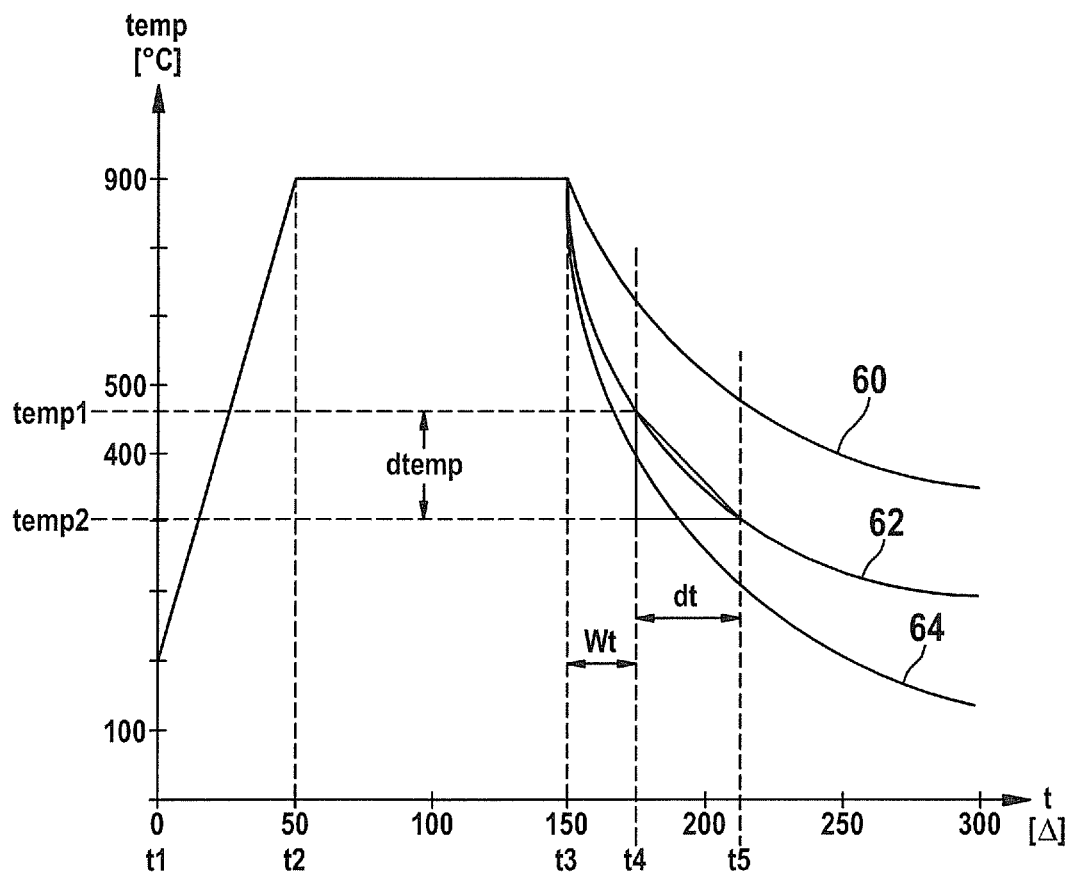
FIG. 2 shows a temperature-time diagram.

According to FIG. 2, an unheated or only slightly heated exhaust gas sensor 20 at a first point in time t1 is assumed, so that exhaust gas sensor 20 has, for example, a sensor temperature temp of, for example, 200° C. to 300° C., which corresponds to exhaust gas temperature temp_Abg.

If a diagnosis signal DAS is present, exhaust gas sensor 20 must initially be heated in this case. For this purpose, heater regulator 38 compares sensor temperature temp with the setpoint value of diagnosis starting temperature temp_setpoint and sets heating signal HZ as a function of the comparison. According to FIG. 2, a sensor temperature temp of, for example, 900° C. should be reached at a second point in time t2. Heater regulator 38 then supplies first enabling signal FG1. The heat output is then reduced or sensor heater 22 is turned off completely. It must be ensured that a sensor temperature drop may occur so that the temperature drop over time may be evaluated.

In the exemplary embodiment illustrated in FIG. 2, it is assumed that, before the heat output is reduced or sensor heater 22 is turned off, exhaust gas sensor 20 continues to be held at diagnosis starting temperature temp_setpoint until a third point in time t3 is reached. Independently of the diagnosis, this may be a burn-off operation of a particle sensor. If diagnosis signal DAS only occurs at this point, it could be possible in this case to dispense with a heating operation which is only necessary for diagnosis, since exhaust gas sensor 20 is already heated.

Temperature gradient ascertaining element 40 ascertains temperature gradient dtemp/dt over time, which in practice is calculated as the temperature difference quotient, as shown in FIG. 2. Temperature gradient dtemp/dt or the temperature difference quotient is a measure dtemp/dt for the temperature drop in relation to time. Temperature gradient dtemp/dt is preferably ascertained upon expiration of predefined waiting time Wt.

Temperature gradient dtemp/dt is compared with first temperature gradient threshold value dSW1 in temperature gradient evaluation 42. If first temperature gradient threshold valve dSW1 is not exceeded, temperature gradient evaluation 42 provides error signal F, which signals an error.

Furthermore, temperature gradient dtemp/dt may be compared with second temperature gradient threshold value dSW2 in temperature gradient evaluation 42. If second temperature gradient threshold value dSW2 is not exceeded, temperature gradient evaluation 42 also provides error signal F, which signals an error.

The diagnosis according to the present invention is based on the finding that deposits, for example a coating of soot, on exhaust gas sensor 20 or a clogged exhaust gas sensor protective tube result in a slower temperature drop over time after sensor heater 22 is turned off or after at least a significant reduction in heat output. Detecting temperature gradient dtemp/dt after a reduction in heating signal HZ or the complete shutdown of sensor heater 22 results in a temperature drop whose gradient dtemp/dt or difference quotient is steeper in a properly functioning exhaust gas sensor 20 than in a coated or clogged exhaust gas sensor 20. The thermal capacity of exhaust gas sensor 20 is increased when coated with particles.

In the exemplary embodiment illustrated in FIG. 1, it is assumed that sensor heater 22 is assigned directly to exhaust gas sensor 20. Alternatively, sensor heater 22 may be understood in such a way that a measure is taken which is used to heat exhaust gas sensor 20. For example, exhaust gas temperature temp_Abg of internal combustion engine 10, which is temporarily increased specifically to heat exhaust gas sensor 20, may be used to heat exhaust gas sensor 20. In this case, a reduction of or shutdown of sensor heater 22 corresponds to a reduction of exhaust gas temperature temp_Abg or a complete canceling of the measure which contributed to the increase in exhaust gas temperature temp_Abg.

If second gradient threshold value dSW2 is provided, with which temperature gradient dtemp/dt is compared, it may be established whether, for example, a protective tube surrounding exhaust gas sensor 20 was opened or removed. This would cause excessively rapid cooling. In this embodiment, exhaust gas sensor 20 is therefore judged to be in proper working order if temperature gradient dtemp/dt lies between the first and the second temperature gradient threshold value.

As mentioned above, temperature gradient dtemp/dt is preferably measured only upon expiry of waiting time Wt, which may be set as a function of the expected temperature drop over time. Waiting time Wt may be in the range of just a few seconds up to some tens of seconds.

In practice, temperature difference quotient temp1−temp2, dtemp is ascertained within a time interval t5−t4, which lies between a fourth and fifth point in time, instead of temperature gradient dtemp/dt and compared with temperature gradient threshold value dSW.

The measurement may be carried out in such a way that time interval t5–t4, corresponding to dt, which may be in the range of just a few seconds to some tens of seconds, is predefined, and temperature difference temp 1–temp 2, dtemp is measured, or temperature difference temp 1–temp 2, dtemp, which may be in the range of some tens of degrees Celsius, is predefined, and time difference t5–t4, corresponding to dt, is measured. The temperature difference quotient, which is valued as temperature gradient dtemp/dt, is subsequently determined therefrom.

Temperature gradient evaluation 42 compares measured temperature gradient dtemp/dt or the temperature difference quotient with first temperature gradient threshold value dSW1. In doing so, first temperature gradient threshold value dSW1 forms a lower limiting value. If the sensor temperature drop is therefore too slow, drops below first temperature gradient threshold value dSW1 and is therefore smaller, temperature gradient evaluation 42 outputs error signal F. This case would correspond to top curve 60 illustrated in FIG. 2.

FIG. 2 shows the gradient ascertainment on the basis of middle curve 62, in this case a sufficiently rapid temperature drop being assumed so that error signal F would not be output.

Temperature gradient evaluation 42 may also compare measured temperature gradient dtemp/dt or the temperature difference quotient with second temperature gradient threshold value dSW2. In this case, second temperature gradient threshold value dSW2 forms an upper limiting value. If the sensor temperature drop is therefore too fast, exceeds second temperature gradient threshold value dSW2 and is therefore larger, temperature gradient evaluation 42 also outputs error signal F. This case would correspond to bottom curve 64 illustrated in FIG. 2.

This is always based on the absolute value of the gradient, since temperature gradient dtemp/dt is negative due to the temperature drop.

Both first and second temperature gradient threshold values dSW1, dSW2 could, in principle, be predefined permanently and thus correspond to uncorrected first and second temperature gradient threshold values dSW1$u$, dSW2$u$. Temperature gradient threshold value setting 44 is advantageously provided which makes it possible to correct first uncorrected temperature gradient threshold value dSW1$u$ and, if necessary, also second uncorrected temperature gradient threshold value dSW2$u$ by exhaust gas mass flow ms_Abg and/or exhaust gas volumetric flow vs_Abg and/or exhaust gas temperature temp_Abg.

Thus, first and, if provided, second temperature gradient threshold value dSW1, dSW2 are increased with rising exhaust gas mass flow ms_Abg and rising exhaust gas volumetric flow vs_Abg, because a faster temperature drop may be expected.

At a higher exhaust gas temperature temp_Abg, on the other hand, first and, if provided, second temperature gradient threshold value dSW1, dSW2 are reduced, because a slower temperature drop may be anticipated.

Reference has already been made to the possibility of stopping the diagnosis if exhaust gas temperature temp_Abg is too high or of aborting an ongoing diagnosis or of discarding an already existing diagnosis result.

Exhaust gas parameters temp_Abg, ms_Abg, vs_Abg, which are supplied to temperature gradient threshold value setting 44, are supplied to sensor control unit 32 via signal bus 50, for example a CAN bus, by internal combustion engine control unit 30, provided that spatially separated control units 30, 32 are provided.

What is claimed is:

1. A method for diagnosing an exhaust gas sensor which is situated in an exhaust gas area of an internal combustion engine for detecting at least one exhaust gas component, which is heated using a sensor heater and whose sensor temperature is detected, the method comprising:
heating the exhaust gas sensor to a diagnosis starting temperature which is higher than an exhaust gas temperature;
at least one of: i) reducing heat output of the sensor heater and ii) completely turning off the sensor heater, such that a temperature of the sensor is able to decrease;
detecting a drop of the temperature of the sensor;
ascertaining a measure for the drop of the temperature of the sensor in relation to time;
comparing the measure with a first temperature gradient threshold value; and
providing an error signal if the ascertained measure for the drop of the temperature of the sensor in relation to time does not exceed the first temperature gradient threshold value.

2. The method as recited in claim 1, wherein a temperature difference quotient is ascertained as the measure for the drop of the temperature of the sensor in relation to time, a certain time difference is predefined, and a temperature difference is ascertained.

3. The method as recited in claim 1, wherein, after the one of the heat output of the sensor heater is reduced or the sensor heater is turned off, a predefined waiting time is observed before the measure for the drop of the temperature of the sensor in relation to time is ascertained.

4. The method as recited in claim 1, wherein the measure for the drop of the temperature of the sensor in relation to time is compared with a second temperature gradient threshold value; and the error signal is provided if the ascertained measure for the drop of the temperature of the sensor in relation to time exceeds the second temperature gradient threshold value.

5. The method as recited in claim 4, wherein a value of the first temperature gradient threshold and the value of the second temperature gradient threshold are reduced at a higher exhaust gas temperature.

6. The method as recited in claim 4, wherein a value of the first temperature gradient threshold and a value of the second temperature gradient threshold are dependent on an exhaust gas volumetric flow, the value of the first temperature gradient threshold and value of the second temperature gradient threshold being increased at a higher exhaust gas volumetric flow.

7. The method as recited in claim 4, wherein a value of the first temperature gradient threshold and a value of the second temperature gradient threshold are dependent on an exhaust gas mass flow, the value of the first temperature gradient threshold and the value of the second temperature gradient threshold being increased at a higher exhaust gas mass flow.

8. The method as recited in claim 1, wherein the exhaust gas sensor is heated to a diagnosis starting temperature in a range between 750° C. and 950° C.

9. The method as recited in claim 1, wherein the exhaust gas temperature is compared with an exhaust gas temperature threshold value; and one of: i) the diagnosing is not started, ii) an ongoing diagnosis is aborted, or iii) an already existing diagnosis result is discarded, if the exhaust gas temperature threshold value is exceeded.

10. A device for diagnosing an exhaust gas sensor, comprising a control unit configured to:
- cause a heating of the exhaust gas sensor to a diagnosis starting temperature which is higher than an exhaust gas temperature;
- at least one of i) reduce of a heat output of a sensor heater, and ii) completely turn off of the sensor heater, such that a temperature of the sensor is able to decrease;
- detect a drop in a temperature of the sensor, ascertain a measure for the drop of the temperature of the sensor in relation to time;
- compare the measure with a first temperature gradient threshold value; and
- provide an error signal if the ascertained measure for the drop of the temperature of the sensor in relation to time does not exceed the first temperature gradient threshold value.

11. The device as recited in claim 10, wherein the control unit includes a heater regulator, a temperature gradient ascertainment arrangement and a temperature gradient comparator.

12. The device as recited in claim 10, wherein a collecting particle sensor is provided as the exhaust gas sensor.

13. The device as recited in claim 12, wherein the particle sensor includes a temperature sensor which provides a measure for the temperature of the sensor.

14. A storage medium storing a computer program for diagnosing an exhaust gas sensor, the computer program, when executed by a control unit, causing the control unit to perform the steps of:
- heating the exhaust gas sensor to a diagnosis starting temperature which is higher than an exhaust gas temperature;
- at least one of: i) reducing heat output of the sensor heater and ii) completely turning off the sensor heater, such that a temperature of the sensor is able to decrease;
- ascertaining a measure for a drop of a temperature of the sensor in relation to time;
- comparing the measure with a first temperature gradient threshold value; and
- providing an error signal if the ascertained measure for the drop of the temperature of the sensor in relation to time does not exceed the first temperature gradient threshold value.

15. A computer program product including a machine-readable carrier storing program code, the program code, when executed by a control unit causing the control unit to perform the steps of:
- at least one of i) reducing heat output of the sensor heater and ii) completely turning off the sensor heater, such that a temperature of the sensor is able to decrease;
- ascertaining a measure for a drop of a temperature of the sensor in relation to time;
- comparing the measure with a first temperature gradient threshold value; and
- providing an error signal if the ascertained measure for the drop of the temperature of the sensor in relation to time does not exceed the first temperature gradient threshold value.

* * * * *